March 21, 1944.  R. F. HLAVATY  2,344,817
SELF-ALIGNING PULLEY
Filed Feb. 16, 1942   5 Sheets-Sheet 1
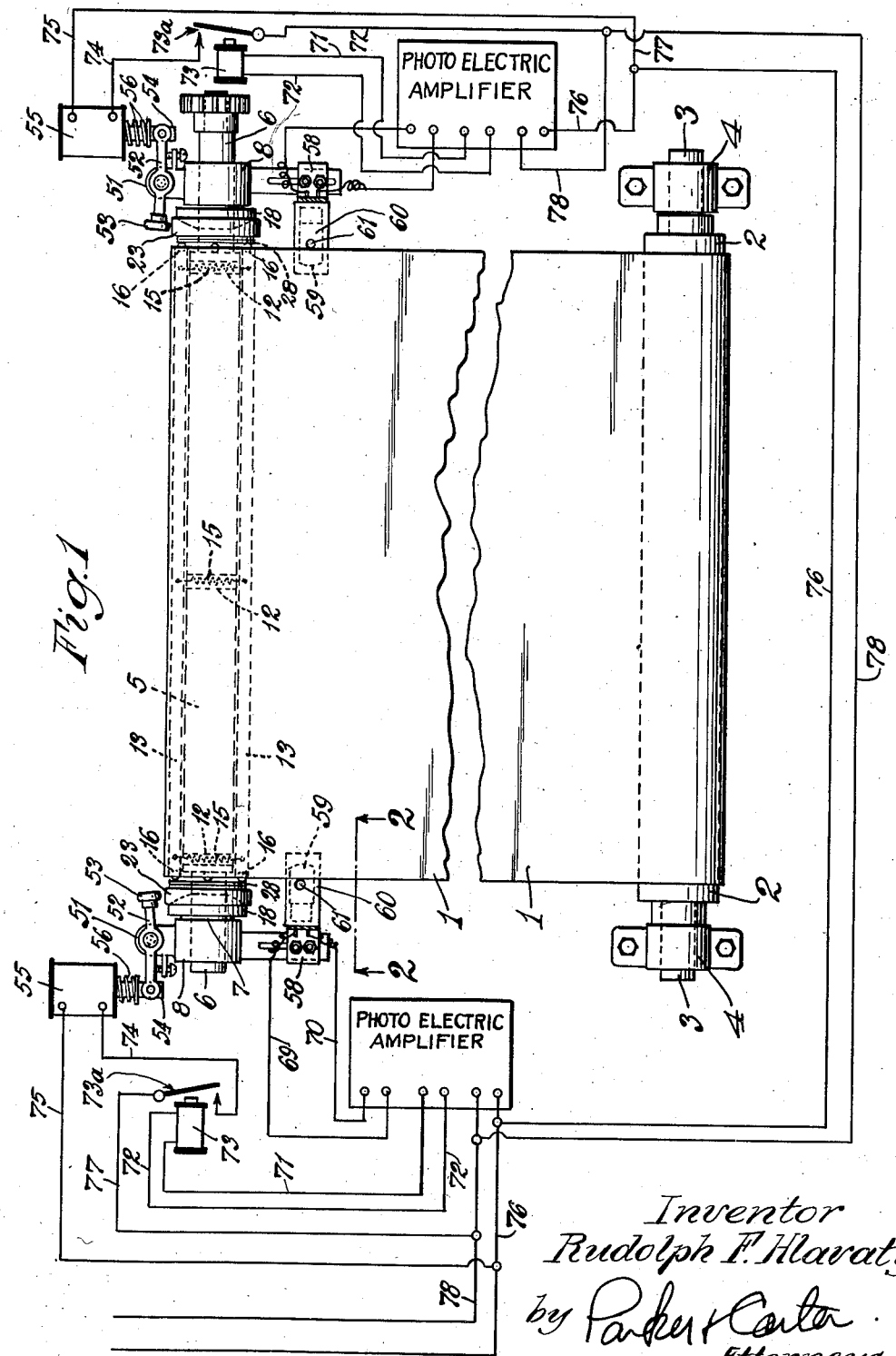
Inventor
Rudolph F. Hlavaty
by Parker & Carter
Attorneys.

March 21, 1944. R. F. HLAVATY 2,344,817
SELF-ALIGNING PULLEY
Filed Feb. 16, 1942 5 Sheets-Sheet 2
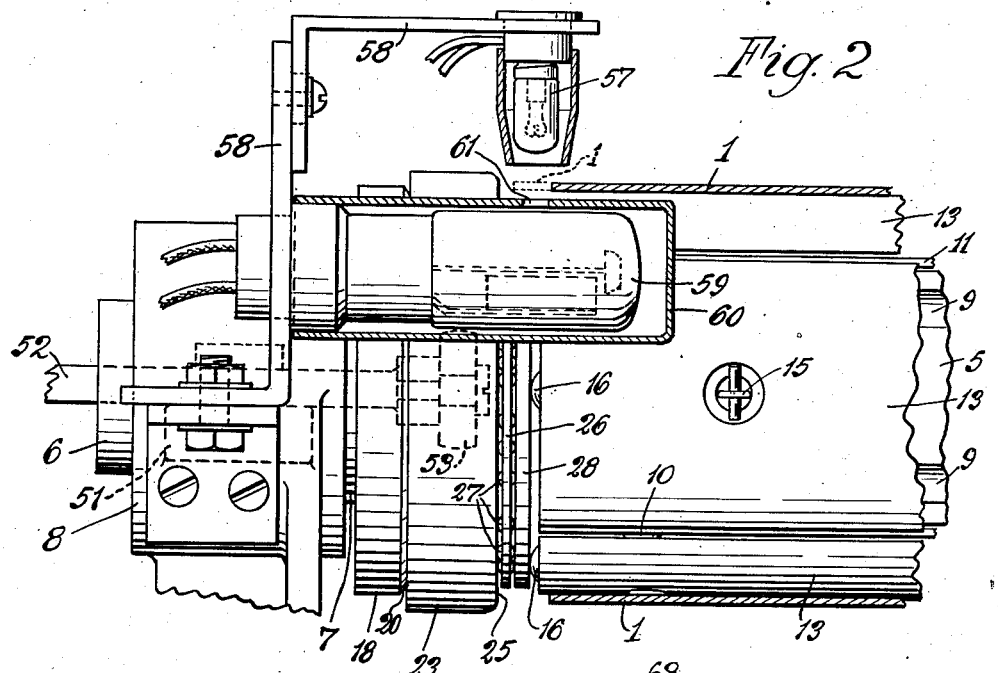
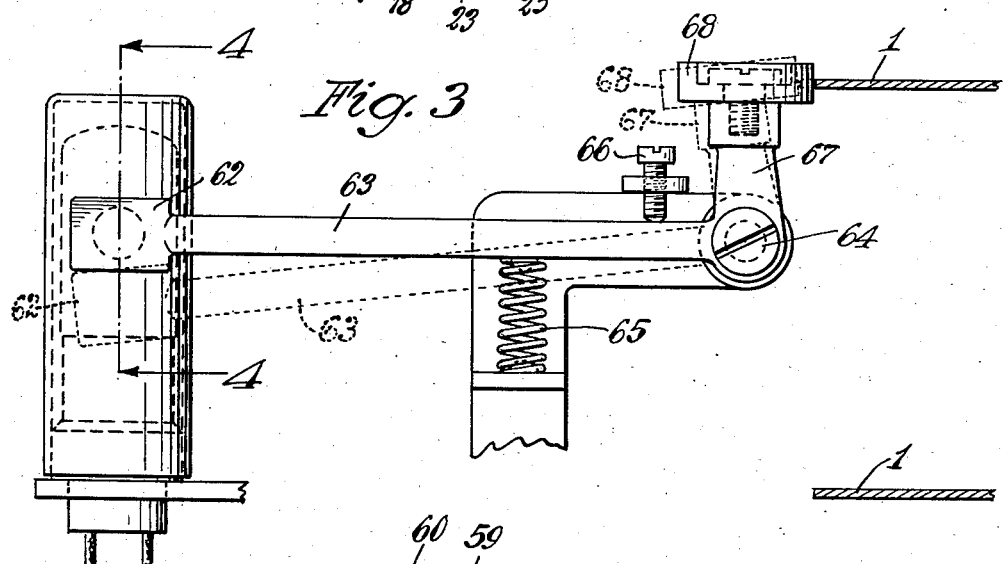
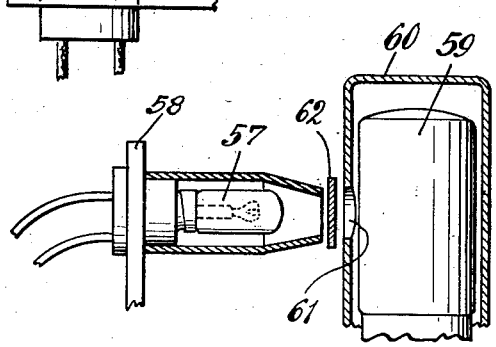
Inventor
Rudolph F. Hlavaty
by
Attorneys March 21, 1944.                R. F. HLAVATY                    2,344,817
                            SELF-ALIGNING PULLEY
                          Filed Feb. 16, 1942          5 Sheets-Sheet 3
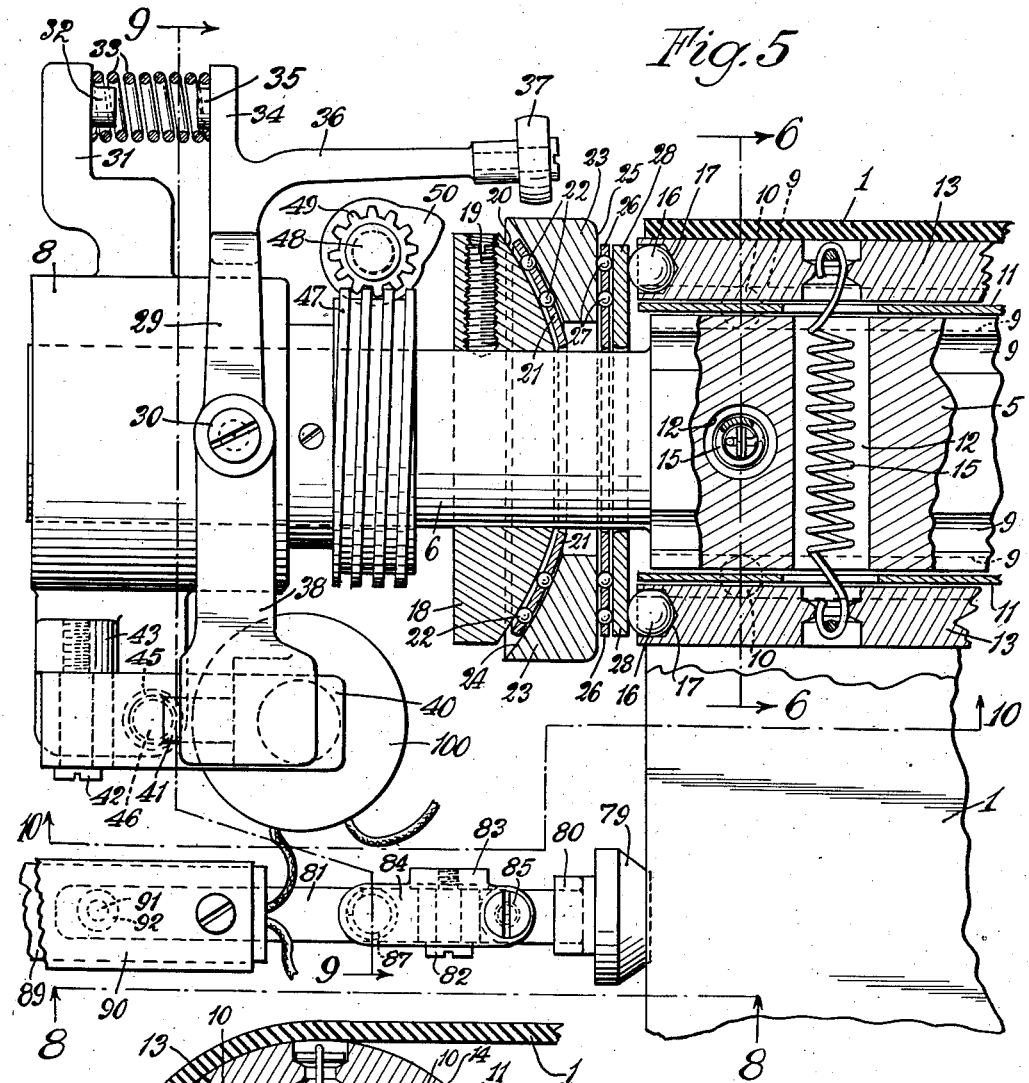
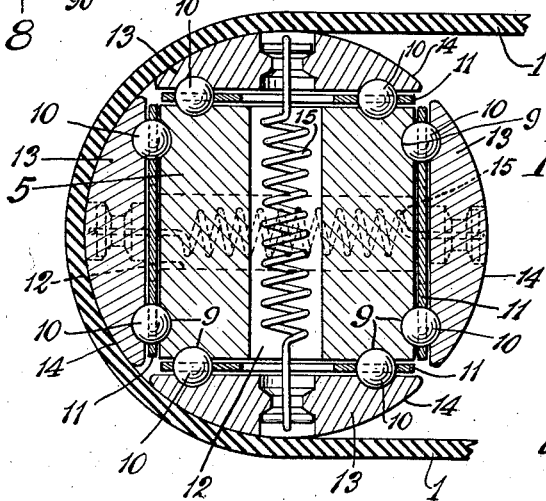
Inventor
Rudolph F. Hlavaty
by Parker & Carter
Attorneys.

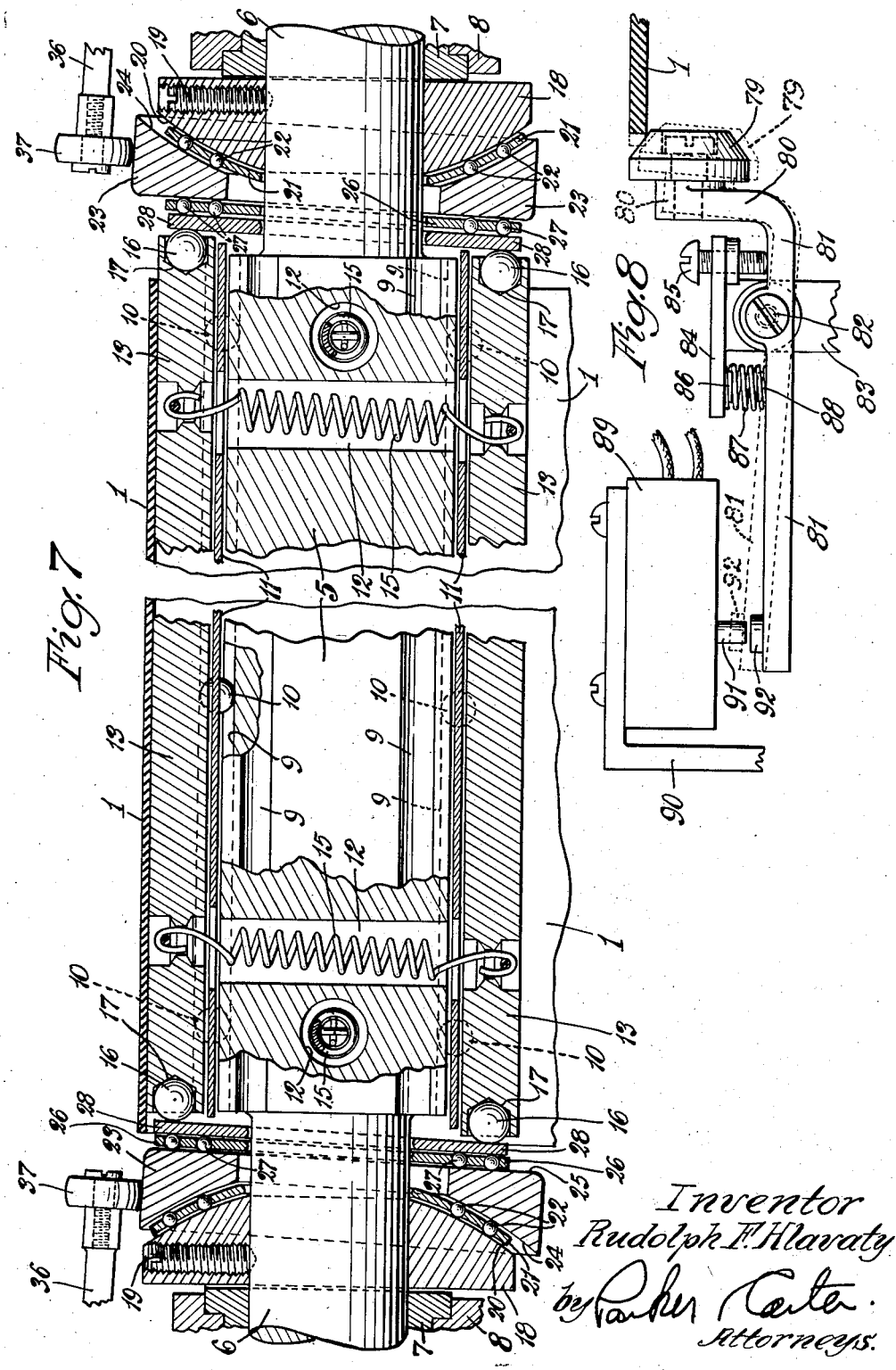

March 21, 1944.   R. F. HLAVATY   2,344,817
SELF-ALIGNING PULLEY
Filed Feb. 16, 1942   5 Sheets-Sheet 5
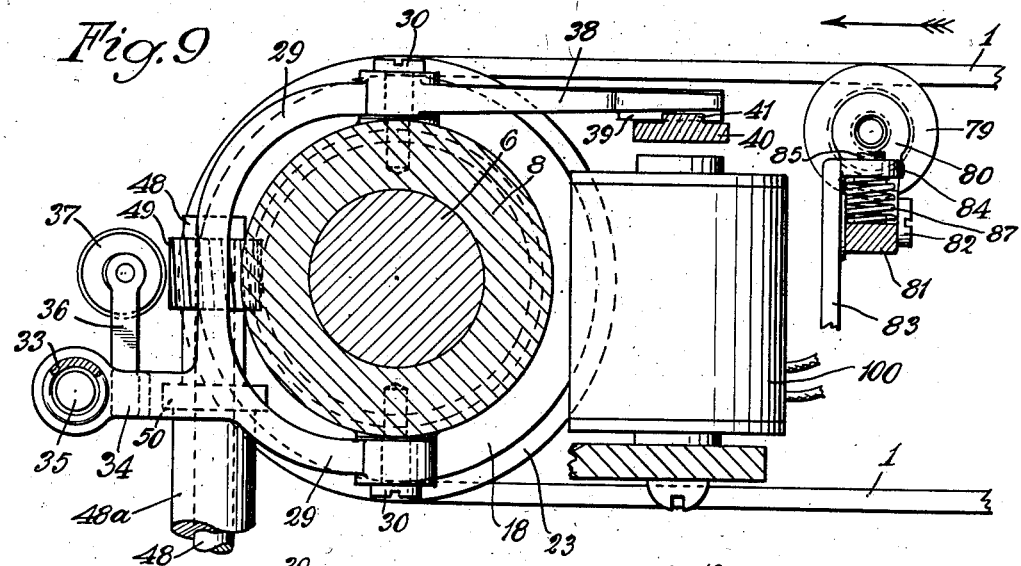
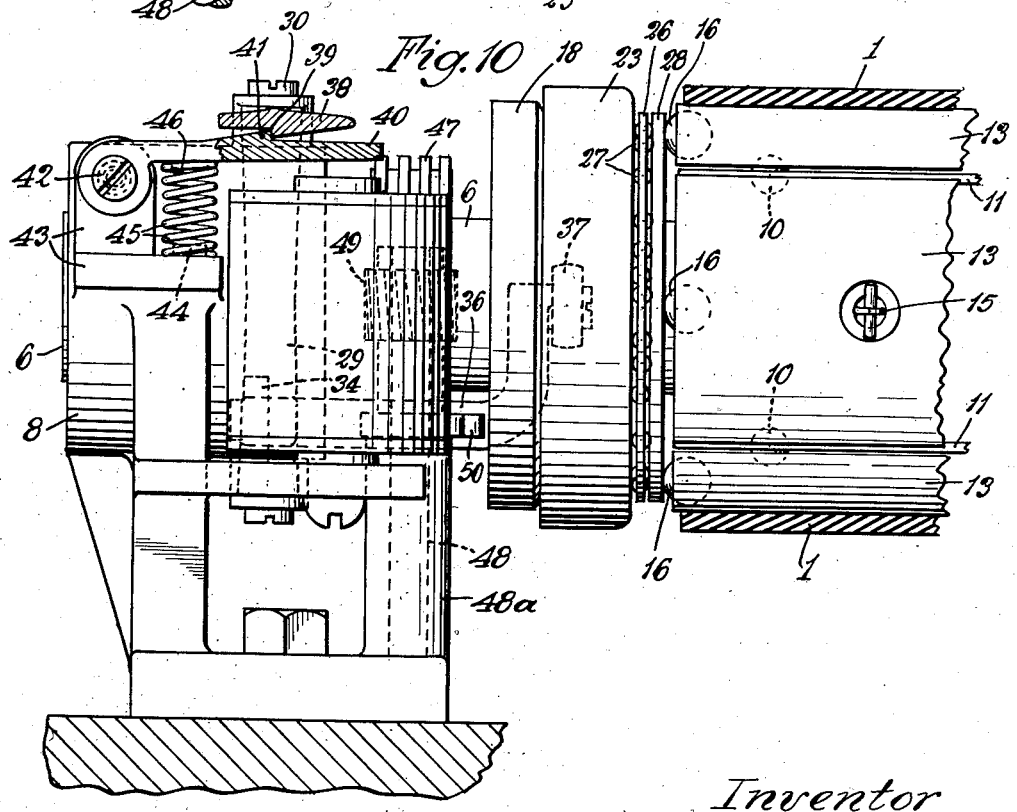
Inventor
Rudolph F. Hlavaty
by Parker & Carter
Attorneys Patented Mar. 21, 1944

2,344,817

UNITED STATES PATENT OFFICE 2,344,817

SELF-ALIGNING PULLEY

Rudolph F. Hlavaty, Cicero, Ill.

Application February 16, 1942, Serial No. 431,092

20 Claims. (Cl. 74—241)

This invention relates to a rotor which is adapted to be associated with another member which rotates or moves with respect to it. In the particular form here shown, it is embodied in a mechanism primarily adapted to serve as a self-aligning pulley and to be associated with a belt or web or some analogous member. The invention, however, is not limited to that particular use or association.

In a sense the invention has for one object the provision of self-aligning means in a member which is generally rounded in cross section.

Another object is specifically to provide a self-aligning pulley.

A still further object is to provide self-aligning means in connection with a rotary member, which means are operated by light sensitive mechanisms.

Another object is to provide means associated with a self-aligning pulley whereby misalignment of a member, which moves in relation to the pulley, is effective upon a light beam or upon a light sensitive element to cause the operation of realigning mechanisms.

The invention is not limited to a pulley. When it is embodied in a pulley it is not limited to any particular type of pulley. It is a self-aligning rotary member that may be used for winding, splicing, cutting, folding, trimming, or twisting a large variety of materials, including paper, cloth, plastics, elastic or metallic material, or other materials. Such material may be handled or treated in bands, strips, rolls, or folds. The rotary element of the invention may, therefore, be used in practically unlimited ways where it is desired to contact, to move, to handle, or to treat material of almost any sort, and it may be embodied in pulleys, rollers, cylinders, or almost any rotary member, whether driving or driven, idling, oscillating, rocking, or otherwise moved or moving.

Other objects will appear from time to time in the specification and claims.

The invention is illustrated more or less diagrammatically in the accompanying drawings, wherein:

Fig. 1 is a plan view with parts omitted and parts broken away, illustrating one form of the invention.

Fig. 2 is a transverse sectional detail taken on an enlarged scale at line 2—2 of Fig. 1;

Fig. 3 is a side elevation in detail on an enlarged scale showing a part of a modified form of operating mechanism.

Fig. 4 is a detail taken at line 4—4 of Fig. 3.

Fig. 5 is a longitudinal sectional detail taken of a further modified form.

Fig. 6 is a transverse section taken at line 6—6 of Fig. 5.

Fig. 7 is a longitudinal section with parts broken away and parts omitted, illustrating both ends of the pulley of Figs. 1, 5, and 6.

Fig. 8 is a section taken on line 8—8 of Figure 5.

Fig. 9 is a transverse sectional detail taken at line 9—9 of Fig. 5.

Fig. 10 is a longitudinal sectional detail taken at line 10—10 of Fig. 5.

Like parts are designated by like characters throughout the specification and drawings.

As shown in Fig. 1, the mechanism of the self-aligning pulley is associated with a belt 1. 2 is a standard and, therefore, a nonself-aligning pulley carried by a shaft 3 which is supported in bearings within the members 4. The self-aligning pulley comprises a body or supporting portion 5 from which end portions 6, 6 extend, and these portions are received in bearings 7, 7 within the housing or bearing supporting portions 8, 8.

As shown, in Figure 6, the pulley body 5 is generally squared or at least is provided with faces which are generally plane and disposed at an angle to each other. In the particular form here shown, there are four such faces and each is provided with a plurality of channels or ball races 9 within which balls or other anti-friction members 10 are positioned for movement. Preferably the balls of each of the faces are associated with a carrier 11 which is generally flat and provided with suitable openings or perforations in which the balls are positioned. The body portion 5 may have a plurality of perforations 12 extending throughout from one side to the opposite side.

For each face of the body 5 there is provided a surface member 13 which may be of any desired shape on one face and is preferably arcuate on its external face as at 14. Thus a plurality of these surface members produces together a generally round surface for the pulley. The oppositely placed surface members 13 of each pair are preferably yieldingly secured together by springs 15 which extend through the perforations 12 and serving yieldingly to hold the surface members against displacement. Each surface member is preferably provided at each of its ends with an anti-friction means. In the particular form here shown, this comprises a ball 16 positioned within a cavity 17.

Fixedly positioned on each of the members 6 is a wedge member 18. In the particular form here shown, the wedge members are adjustably held in place by set screws 19. Each of the members 18 is preferably provided with one convex face 20, adjacent which is positioned a ball carrier or cage member 21 which is provided with suitable openings to receive balls, rollers or other anti-friction members 22. The carrier or cage is preferably concavo-convex.

Positioned adjacent each of the wedge members 18 is a movable wedge member 23. This member in effect floats and is provided with a concave face 24 which is in contact with the balls or other anti-friction members 22. While the opposite faces of the member 23 may be of almost any desired shape, as shown, and is flat as at 25. A ball cage or carrier 26 provides spaces within which balls or other anti-friction members 27 are positioned and these are in contact with the face 25 of the member 23. A washer 28 may be positioned in contact with the balls 27 and it will be in contact, on its opposite faces, with the anti-friction face 16 of the surface members 13. While a variety of anti-friction assemblies has been shown, the invention is not limited to any particular means and the balls or roller members may be omitted.

As shown in Figs. 1 and 5, the surface members are in the position of alignment which they occupy when the belt is itself in proper alignment. As shown in Fig. 7, however, they are in the position which they occupy after misalignment has occurred and after the mechanism for correcting misalignment has operated. This mechanism includes means for pressing upon each of the movable wedge members 23 and this mechanism is substantially the same at each end of the self-aligning pulley. In the particular form here shown, this means include a yoke member 29 which is supported for tilting movement. In the particular form here shown, it is supported by screws 30, 30 upon the member 8, although it may be otherwise supported. Fixed on some relatively immovable piece, such as the member 8, is a bracket 31 provided with a boss 32 about which one end of a spring 33 is positioned. At its opposite end the spring bears against an extension 34 from the yoke 29 and this extension may on one face be provided with a boss 35 to receive the opposite end of the spring 33. The extension 34 has mounted upon it an arm 36 upon which is movably mounted a roller 37. As shown particularly in Figs. 1 and 5, the roller is positioned to contact the movable or floating wedge member 23, and the spring 33 will, when free to do so, rotate the yoke 29 and force the arm 36 and roller 37 down into the position in which the left-hand roller 37 occupies in Fig. 7.

One arm of the yoke 29 is provided with an extension 38 which, adjacent one end, is provided with a notch or ledge 39 which may engage with a latch member 40 which has a raised portion 41 to engage with the notch or shoulder 39. The latch member 40 is itself pivoted upon a screw or other member 42 which is itself removably received in an extension 43 of bearing housing 8. A boss 44 may be provided on part of the extension to receive one end of a spring 45, the other end of which bears against the latch member 40 and may be positioned about a boss 46 secured to the latch member. Mounted in alignment with the lever 40 is an electro-magnet 100, which when energized rotates the lever 40 clockwise, referring to Fig. 10, and moves the raised portion 41 out of contact with the shoulder 39 and unlatches the yoke 29. The spring 33 now functions and moves the arm 36 and roller 37 from the position of Fig. 5 to the position of Fig. 7.

As a means for resetting the arm and latch and thus for carrying the roller 37 out of contact with the wedge member 23, there is provided on each of the portions 6 a threaded member 47. Such a threaded member will be provided at each end of the assembly, that is to say, upon each one of the portions 6. Mounted adjacent each of the theaded members 47 is a shaft or pin 48, which may be supported in a member 48a or integral with the bearing member 8. Each shaft 48 carries a worm gear 49 which meshes with the threaded member 47 and a cam 50 which is rotated by means of the worm gear 49. As the cam 50 is rotated, the nose of the cam engages the arm 36 and moves the yoke 29 and associated parts to the initial latched position shown in Figures 5 and 10.

It will be noticed that there are several modified arrangements of the mechanism. The lever and roller assembly just described above appear in Figs. 5, 9 and 10. The lever assembly of Fig. 1 is somewhat different and will now be described.

Mounted on the bearing housing members 8 is a support 51. A lever arm 52 is supported on member 51 for rotation at one end and each lever arm carries a roller 53 which is similar to the roller 37 and serves a similar purpose. At its opposite end each lever is secured to a member 54 of a solenoid 55. A spring 56 is effective, when free to do so, to force the member 54 out of the solenoid and thus to hold the roller 53 out of contact with the wedge member 23. When the solenoid is energized, however, the member 54 is drawn in against the resistance of the spring and the roller 53 is brought into contact with the wedge 23 to move it.

The several forms of the invention have this in common, namely, that in each case means is provided for exerting pressure upon the movable or floating wedge member so as to move it to effect movement of one or more surface members of the pulley. The actual movement of the lever may be accompanied either by the action of a spring such as the spring 33 or by the action of a solenoid such as the solenoid 55. In each case an electric means is used and each electric means may be used in any of the forms.

In the form of Figs. 1 and 2 a light source 57 is carried from a bracket 58 or is otherwise supported. It is positioned adjacent one edge of the belt, as shown particularly in Fig. 2. When the belt is properly aligned the light from the light source falls upon a photo-electric cell 59 which may be positioned within a shell 60 provided with a perforation 61 through which the light may fall from the light source 57, when the latter is not obstructed by misalignment of the belt. The photo-electric cell 59 is also supported from the bracket 58.

In the modified form shown in Figs. 3 and 4, the light source 57, instead of being positioned above or approximately above one edge of the belt 1, is positioned to one side of the belt and the photo-electric cell 59 is also positioned to one side of the belt. The misalignment of the belt is, however, equally effective to interrupt passage or light from the light source to the photo-electric cell by reason of the provision of a shutter 62 which is carried on a lever arm 63 which is pivoted as at 64. A spring 65 holds the shutter upward in the inactive position when free to do so, and a set screw 66 limits the upward movement of the lever arm 63. The lever arm 67, which is secured to or forms an extension of the lever arm 63, is provided at its upper end with a roller 68 arranged to be contacted by and moved by the belt or the edge of the belt when the belt moves into a misaligned position.

Whichever means is used for interrupting the passage of light from the light source to the light sensitive photo-electric cell is immaterial. As shown in Fig. 1 the photo-electric cell is connected to a photo-electric amplifier by means of wires or conductors 69 and 70. Conductors 71 and 72 lead from the amplifier and are connected to a relay 73. A conductor 74 leads from one contact of the relay switch 73a to one pole of the solenoid 55, and a conductor 75 leads from the opposite pole of the solenoid to a power line 76 from which current is received.

The opposite contact of the relay switch receives current through a conductor 77 which is connected to a power line 78 or source of current. Thus current is received in the photo-electric amplifying assembly through conductors 76 and 78. The details of the amplifier and of the amplifier circuits are not illustrated herewith, since these details form no essential part of the present invention. Such amplifiers and such circuits and members defining them are well known in the art and are readily available in the market.

Another form of the device utilizing a different electric means and not utilizing light sensitive or photo-electric means is illustrated in Figs. 5, 8 and 9. As there shown, a roller 79, preferably having a beveled edge, is mounted for rotation on the upwardly bent portion 80 of arm 81. This arm is pivotally mounted as at 82. The pivotal support for the arm 81 is carried by a member 83, or otherwise, and this member may be supported from any suitable point. A bracket 84 is associated with the member 83 and at one end receives an adjustable stop screw 85. At the other end it is provided with a boss 86 which receives one end of a spring 87. The arm 81 is provided with a boss 88 to receive the opposite end of the spring 87.

The arm is associated with a micromatic switch 89 supported in a bracket 90, or otherwise. The switch is provided with an operating member 91 which is mounted to be contacted by the lever 81 or by a boss 92 formed on the lever.

The details of the micromatic switch are not shown as they form no essential part of the present invention. Micromatic switches are generally known and available on the market, and comprise electric switches which operate rapidly and upon a very slight movement of the parts, so that they are suitable for use where only relatively slight movements will occur and they can be moved with the expenditure of a minimum of energy.

In the form of Fig. 1 the wedge mechanism is moved by the simple lever 52 operated by the solenoid 55. The solenoid circuit may be controlled by the light sensitive means shown in Fig. 2 or the modified form shown in Figs. 3 and 4. The lever operating means might have its circuit controlled by the micromatic switch arrangement of Figures 5, 8 and 9. The mechanism of Figures 5, 6 and 7 embodies a lever arranged to be spring operated to move the wedge 23. The lever is normally latched against operation and is released by electric means. These means are shown as being controlled by the micromatic switch and its operating mechanism. However, the electric means of this form of device might be controlled equally well by either the form of the light sensitive device of Figure 2 or by the modified form of that device shown in Figures 3 and 4. Thus in all forms of the device the floating wedge is moved by the exertion of pressure upon it in order to effect a realignment of the belt, and in all forms of the device the movement of this lever is accompanied by or is controlled by electric means which are themselves affected and controlled by misalignment of the belt.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

In particular, the various forms of the mechanism shown may be combined in several ways. For example, the photo-electric cell mechanism, even in the form shown in Figure 2 or the form shown in Figures 3 and 4 may be used to control the operation of the solenoid 55, and similarly the micromatic switch 89 may be used to control the solenoid 55, and thus to control the movement of the lever 36, and through it, the movement of the wedge 23. Whichever of the mechanisms is used, the re-aligning operation is carried out in response to misalignment of the belt, and this misalignment of the belt effects an operating member or device positioned ahead of the pulley in the line of belt movement. When this occurs the wedge means for moving a surface member 13 to effect re-alignment is caused to operate, and the several forms of the device herewith illustrated therefore have that feature in common. It is recognized that some photo-electric assemblies are arranged to be actuated when a light falls on a photo-sensitive cell, while other photo-electric assemblies are arranged to be actuated when a light beam which normally falls continuously on a photo-electric cell is interrupted, so that the cell is no longer actuated by a light beam. Either form of photo-electric mechanism is within the contemplation of this invention, and the particular forms shown are therefore merely illustrative.

It has been pointed out above that the invention is not limited to the use of a belt and pulley, but may be embodied in a wide variety of constructions which include rotary members. It is to be understood, therefore, that where the word "belt" is used in the claims, it includes not merely a belt proper, but any material with which the rotary means may be in contact.

The self-aligning pulley disclosed above may be made of any desired material. For many purposes it will be made of metal, and it may cooperate with a belt or other contact member which is made of any desirable material. The choice of materials both for the various parts of the pulley assembly and for the belt or other contact member will depend upon the use to which the device is to be put and upon the materials which are to be handled or conveyed. While the pulley assembly will generally be of metal, it may be made of almost any other material, such as cement, glass, ceramic materials, plastics, or other materials, and of course the parts may be formed by casting, die-casting, machining, or any other desired manner, and the apparatus may be used for conveying any desired material and can be arranged to operate indoors, outdoors, on heavy materials or light, to handle liquids, solids, acids, hot materials or cold materials. In short, the material of which the various parts of the apparatus shown can be made may be varied as desired, dependent upon the service to which the apparatus is to be put.

The use and operation of the invention are as follows:

Assuming the mechanism of Figure 1 to be in operation, the pulleys are rotating and the belt is moving. Either of the pulleys may be an idler, or either may be driven. The belt will ordinarily be initially in proper alignment, and a light beam from the light source 57 falls on the cell 59, and the several surface elements 13 are in proper centered position with relation to the remainder of the pulley.

It is to be supposed now that the belt moves out of alignment, moving, for example, to the left from the position shown in Figure 1, the beam passing through the opening 61 in the housing 60 to the left of Figure 1 is cut off. Since this particular form of photo-electric assembly is arranged to remain inoperative, as long as the photo-electric cell is actuated, as soon as the beam is cut off the photo-electric assembly shown is effective through means which are well known, to actuate the magnet 73, and the relay switch 73a, is drawn into contact. The solenoid 55 is then actuated and the lever 53 is drawn down to contact the wedge member 23. This operation is shown in Figure 7, but when it occurs, the wedge member 23 is depressed to the position shown in Figure 7 and carries the surface member 13 which is uppermost in Figure 7 to the right, thus to some degree correcting the misalignment. At the same time the opposite wedge member 23 at the opposite end of the assembly is itself forced to the right at its upper edge, and at its lower edge forces the surface member 13, which is lowermost in Figure 7, to the left, so that when that member comes in contact with the belt, it further corrects the misalignment.

As soon as the misalignment is corrected, the belt moves again to the proper position and no longer interrupts the beam of light moving from the light source 57 through the opening 61 to the cell 59, and when that occurs the cell is effective to break the circuit to the magnet 73 and the relay switch 73a moves out of contact with the pole which is connected to the conductor 74, and the solenoid is de-energized so that the spring 56 moves the lever 52 to carry the roller 53 out of contact with the wedge 23, and the parts then are in the original position of Figure 1.

In the modified form of Figures 3 and 4, the photo-electric mechanism is such that when the cell 59 is de-energized, the relay 73 does not operate, and no contact is made by the relay switch 73a. As shown in Figure 3, the shutter 62 is normally held in the full-line position of that figure by the spring 65, and it interrupts the light which would otherwise fall from the light source 57 upon the cell 59. When, however, misalignment of the belt occurs, the belt may move, for example, to the right of the position shown in Figure 3, and carry the shutter assembly to the dotted line position of that figure. When this occurs, the shutter is moved into negative position and light falls from the light source 57 upon the cell 59 and the device is then effective to energize magnet 73, to put the relay switch member 73a into contact, and the operation previously described takes place, the solenoid being energized, the roller 53 being brought into contact with the wedge 23, and moving it as shown in Figure 7. When the misalignment has been corrected, the shutter 62 is again moved into the position of Figure 3 by means of the spring 65, and the light no longer can fall upon the cell 59, and the circuit is broken and relay wedge member 73a moves to the position of Figure 1 in which the solenoid is de-energized and the spring 56 is again effective to move the roller 53 out of contact with the wedge 23.

Should the photo-electric device be eliminated and the micromatic switch of Figure 8 used instead, there will of course be one such switch on each side of the belt, and so long as the belt remains in alignment the switch occupies the full-line position of Figure 8. When the belt moves out of alignment, for example, to the left, into the dotted line position of Figure 8, the lever parts of that figure are moved to the dotted line position, and the switch 89 is actuated. This switch may be connected to the solenoid 55 by the conductors shown in Figure 8, and when that is done the solenoid will be actuated as above described, and when misalignment is corrected the belt moves back to the full-line position, and the spring 87 is free to restore the switch lever 81 to the full-line position so as to break the circuit to de-energize the solenoid and to permit the spring 56 to restore the lever 52 and the roller 53 to their original negative position.

From the above it is clear that either of the forms of the photo-electric mechanism or the micromatic switch may be effective to operate the solenoid 55.

In the form of Figures 5, 9, and 10, instead of the solenoid 55 and the lever 52, a magnet 100 and a lever 36 are used, but the magnet, unlike the solenoid, is in the main a power source for causing the member 36 to move to correct misalignment. It is merely effective to unlatch or release the lever so that it may be moved by the spring 33 to effect realignment. As shown in Figure 5 the micromatic switch of Figure 8 is also used, and it is operated as above described, and when so operated it completes the circuit to the magnet 100. When that occurs the lever 44 is drawn downward from the position of Figure 10, and the arm 38 of the yoke 29 is thus freed from engagement as soon as the shoulder 41 is moved out of contact with the notch 39. When that occurs, the spring 33 is free to move the yoke 29 together with its arm 36 clockwise from the position shown in Figure 5, and the roller 37 then exerts a pressure upon the wedge 23 in the same manner as above described in connection with the roller 53. In other words, whether it be the lever 52 and the roller 53 or the lever 36 and the roller 37, whichever is moved clockwise from their respective positions, the lever exerts a pressure on the wedge 23 and carries out the operation which is illustrated in detail in Figure 7.

Means are provided, as shown in Figure 5, for re-setting the spring 33. This means includes the screw 47 and the worm 49. These are constantly in engagement with each other, and once in each rotation on the shaft 48 upon which the worm 49 is fixed, the cam 50 is rotated and contacts the member 36 to move it upwardly, and this movement of course moves the yoke 29 counter-clockwise and brings the lever 38 into the position in which the notch 39 engages the notch 41 on the lever 40, which is constantly forced upwardly by the spring 45, and thus the lever 38 is latched upwardly so that the roller 37 is out of contact with the wedge 23.

While the magnet 100 is shown as being energized by the micromatic switch, it is to be understood that its circuit might be equally well controlled by either of the arrangements of photoelectric cells shown in Figure 2 or in Figures 3 and 4, and thus the operation of the form of the device shown in Figures 5, 9, and 10 is not limited to the use of a photo-electric cell, and might be operated by a large variety of other circuit making and breaking means.

I claim:

1. In combination, a belt and a pulley, said pulley including a body and a longitudinally movable surface member, said body being mounted for rotary movement only, and means for moving said surface member longitudinally, with relation to said body, to correct belt misalignment, electric means for controlling the operation of said moving means, and adapted upon misalignment of the belt to control the movement of said surface member moving means.

2. In combination, a belt and a pulley, said pulley including a body mounted for rotary movement only and a longitudinally movable surface member carried thereby, and means for moving said surface member longitudinally to correct belt misalignment, light-sensitive electric means for controlling the operation of said moving means, and adapted upon misalignment of the belt to control the movement of said surface member moving means.

3. In combination, a belt and a pulley, said pulley including a body mounted for rotary movement only and a longitudinally movable surface member carried thereby, and means for moving said surface member to correct belt misalignment, electric means for controlling the operation of said moving means, said electric means being positioned adjacent the edge of said belt and adapted upon misalignment of the belt to control the movement of said surface member moving means.

4. In combination, a belt and a pulley, said pulley including a body mounted for rotary movement only and a longitudinally movable surface member mounted thereon, and means for moving said surface member to correct belt misalignment, light-sensitive electric means for controlling the operation of said moving means, said electric means being positioned adjacent the edge of said belt and ahead of said pulley in the direction of belt movement, and adapted upon misalignment of the belt to control the movement of said surface member moving means.

5. In combination with a self-aligning pulley, a belt in contact therewith, a pulley body, a plurality of surface members positioned thereon for longitudinal movement with respect thereto, wedge members positioned at each end of said pulley, each being in contact with one end of the surface members, and means for moving said wedge members to give the surface members longitudinal movement, the said wedge members and surface members being so related that when one wedge member is moved in one direction it moves a surface member, which surface member thereby moves the other wedge member in the opposite direction, and that wedge member moves another surface member in a direction opposite to the movement of said first surface member, and electric means positioned adjacent the edge of the belt which is in contact with said pulley, electrically controlled means for operating said wedge members in response to the action of said electric means.

6. In combination, a pulley and a belt in contact therewith, and means for maintaining the belt in aligned position with respect to the pulley, said means including a pulley body, a plurality of surface members positioned thereon for longitudinal movement with respect thereto, a plurality of movable wedge members positioned one adjacent each end of said pulley, and electrically controlled means for causing said movable wedge members to be moved, said movable wedge members so positioned with respect to said surface members that movement of the movable wedge members causes longitudinal movement of the surface members, and light-sensitive electric means positioned adjacent said pulley, each of said electrical means connected to one of the wedge operating means and adapted upon the occurrence of misalignment on one side of the assembly to cause actuation of its respective wedge operating means to correct misalignment.

7. In combination, a pulley and a belt in contact therewith, and means for maintaining the belt in aligned position with respect to the pulley, said means including a pulley body, a plurality of surface members positioned thereon for longitudinal movement with respect thereto, a plurality of movable wedge members positioned one adjacent each end of said pulley, and electrically actuated and controlled means for causing said movable wedge members to be moved, said movable wedge members so positioned with respect to said surface members that movement of the movable wedge members causes longitudinal movement of the surface members, and light-sensitive electric means positioned adjacent said pulley, each of said electrical means connected to one of the wedge operating means and adapted upon the occurrence of misalignment on one side of the assembly to cause actuation of its respective wedge operating means to correct misalignment.

8. In combination, a pulley and a belt in contact therewith, and means for maintaining the belt in aligned position with respect to the pulley, said means including a pulley body, a plurality of surface members positioned thereon for longitudinal movement with respect thereto, a plurality of movable wedge members positioned one adjacent each end of said pulley, and electrically controlled means for causing said movable wedge members to be moved, said movable wedge members so positioned with respect to said surface members that movement of the movable wedge members causes longitudinal movement of the surface members and causes opposite movement of oppositely placed surface members, and light-sensitive electric means positioned adjacent said pulley, each of said electrical means connected to one of the wedge operating means and adapted upon the occurrence of misalignment on one side of the assembly to cause actuation of its respective wedge operating means to correct misalignment.

9. In combination, a pulley and a belt in contact therewith, and means for maintaining the belt in aligned position with respect to the pulley, said means including a pulley body, a plurality of surface members positioned thereon for longitudinal movement with respect thereto, a plurality of movable wedge members positioned one adjacent each end of said pulley, and electrically controlled means for causing said movable wedge members to be moved, said movable wedge members so positioned with respect to said surface members that movement of the movable wedge members causes longitudinal movement of the surface members, and light-sensitive electric means positioned adjacent said pulley, one on each side of said belt, in the direction of belt travel toward said pulley, each of said electrical means connected to one of the wedge operating means and adapted upon the occurrence of misalignment on one side of the assembly to cause actuation of its respective wedge operating means to correct misalignment.

10. In combination, a pulley and a belt in contact therewith, and means for maintaining the belt in aligned position with respect to the pulley, said means including a pulley body, a plurality of surface members positioned thereon for longitudinal movement with respect thereto, a plurality of fixed wedge members, one at each end of said body, a plurality of movable wedge members positioned one adjacent each end of said pulley, and electrically actuated and controlled means for causing said movable wedge members to be moved, said movable wedge members so positioned with respect to said surface members that movement of the movable wedge members causes longitudinal movement of the surface members, and light-sensitive electric means positioned adjacent said pulley, each of said electrical means connected to one of the wedge operating means and adapted upon the occurrence of misalignment on one side of the assembly to cause actuation of its respective wedge operating means to correct misalignment.

11. In combination, a pulley and a belt in contact therewith, and means for maintaining the belt in aligned position with respect to the pulley, said means including a pulley body, a plurality of surface members positioned thereon for longitudinal movement with respect thereto, a plurality of fixed wedge members, one at each end of said body, a plurality of movable wedge members positioned one adjacent each end of said pulley, and electrically actuated and controlled means for causing said movable wedge members to be moved, said movable wedge members so positioned with respect to said surface members that movement of the movable wedge members causes longitudinal movement of the surface members, and light-sensitive electric means positioned adjacent said pulley, one on each side of said belt, each of said electrical means connected to one of the wedge operating means and adapted upon the occurrence of misalignment on one side of the assembly to cause actuation of its respective wedge operating means to correct misalignment.

12. In combination, a pulley and a belt in contact therewith, and means for maintaining the belt in aligned position with respect to the pulley, said means including a pulley body, a plurality of surface members positioned thereon for longitudinal movement with respect thereto, a plurality of fixed wedge members, one at each end of said body, a plurality of movable wedge members positioned one adjacent each end of said pulley, and electrically actuated and controlled means for causing said movable wedge members to be moved, said movable wedge members so positioned with respect to said surface members that movement of the movable wedge members causes longitudinal movement of the surface members, and light-sensitive electric means positioned adjacent said pulley, one on each side of said belt, in the direction of belt travel toward said pulley, each of said electrical means connected to one of the wedge operating means and adapted upon the occurrence of misalignment on one side of the assembly to cause actuation of its respective wedge operating means to correct misalignment.

13. In combination, a pulley and a belt positioned to move thereabout and in contact therewith, and means for retaining the belt in aligned position, said means including a pulley body, a plurality of surface members positioned thereon for longitudinal movement with respect thereto, wedge means positioned on the pulley body and adapted to cause longitudinal movement of said surface members, and means for acting upon said wedge means, in response to misalignment of the belt, said means including light-sensitive, electrical apparatus positioned adjacent the edge of said belt and adapted to be actuated by misalignment of the belt to control the movement of said wedge operating means.

14. In combination, a pulley, a belt in contact therewith, and means for maintaining the belt in proper alignment with respect to the pulley, said means including surface members mounted in said pulley for longitudinal movement, and means positioned on said pulley for causing said surface members to have longitudinal movement and for causing oppositely positioned surface members to move in directions opposite to each other, and photo-electric means positioned adjacent the edges of said belt, and ahead of said pulley in the direction of belt movement, each of said photo-electric means adapted, when the belt moves out of alignment in its direction, to actuate its surface member moving means to correct misalignment.

15. In combination, a web of material and a rotor, said rotor including a body mounted for rotary movement only and a longitudinal movable surface member mounted upon said body, and means for moving said surface member to correct misalignment of the web of material, electric means for controlling the operation of said moving means, said electric means being positioned adjacent the edge of said web of material and adapted upon misalignment of the web of material to control the movement of said surface member moving means.

16. In combination a belt and a pulley, said pulley including a surface portion adapted for contact with said belt, means for maintaining said pulley for rotation about a fixed axis, and means for moving only that portion of the pulley with which the belt is in contact to correct belt misalignment, electric means for controlling the operation of said moving means and adapted upon misalignment of the belt to control movement of said moving means, said electric means including electrically actuated parts, and light-sensitive parts positioned to be effected by belt misalignment.

17. In combination a belt and a pulley, said pulley including a surface portion adapted for contact with said belt, means for maintaining said pulley for rotation about a fixed axis, and means for moving only that portion of the pulley with which the belt is in contact to correct belt misalignment, a plurality of electric means for controlling the operation of said moving means and adapted upon misalignment of the belt to control movement of said moving means, said electric means including light-sensitive members which are positioned one on each side of said belt, and means for projecting a beam of light upon each of said light-sensitive members, said beams being so directed that they remain unbroken when the belt is properly aligned and are adapted to be broken when the belt is misaligned.

18. In combination a belt and a pulley, said pulley including a surface portion adapted for contact with said belt, means for maintaining said pulley for rotation about a fixed axis, and means for moving that portion of the pulley with which the belt is in contact to correct belt misalignment, electric means for controlling the operation of said moving means and adapted upon misalignment of the belt to control movement of said moving means, said electric means including light-sensitive devices positioned one on each side of said belt, and means for projecting light upon each of said light-sensitive means, a shutter for each light-sensitive means adapted when the belt is in proper alignment to interrupt its respective beam of light, and mechanical operating means for each of said shutters, said operating means including a member adapted to be contacted by said belt when the latter is misaligned, and to be moved by belt movement in the direction of misalignment, to move its respective shutter out of the path of its light beam, whereby one or another of the light-sensitive means is actuated.

19. In combination a belt and a pulley, means for maintaining said pulley for rotation about a fixed axis, and means for imparting to said belt a lateral thrust to correct belt misalignment, electric means for controlling the operation of said lateral thrust imparting means and adapted upon misalignment of the belt to control the movement of said lateral thrust imparting means, said electric means including light-sensitive devices positioned one on each side of said belt, and means for projecting light upon each of said light-sensitive means, a shutter for each light sensitive means adapted when the belt is in proper alignment to interrupt its respective beam of light, and mechanical operating means for each of said shutters, said operating means including a member adapted to be contacted by said belt when the latter is misaligned and to be moved by belt movement in the direction of misalignment, to move its respective shutter out of the path of its light beam, whereby one or another of the light-sensitive means is actuated.

20. In combination, a belt and a pulley, said pulley including a shaft portion fixed against axial movement and free for rotary movement alone, and a surface member axially movable in relation to the shaft member, and means for moving the surface member axially in relation to said shaft member to correct belt misalignment, including a light-sensitive means aligned generally with the edge of the belt, an intermediate member opposed to said longitudinally movable surface member and adapted to impart axial movement thereto, and means responsive to said light-sensitive means for imparting movement to said intermediate member.

RUDOLPH F. HLAVATY.